United States Patent [19]

Bouman et al.

[11] 4,356,794
[45] Nov. 2, 1982

[54] HOT WATER BOILER

[75] Inventors: Johannes Bouman, Nuenen; Peter J. M. van der Linden, Breda, both of Netherlands

[73] Assignee: Tricentrol Benelux B.V., Breda, Netherlands

[21] Appl. No.: 201,276

[22] Filed: Oct. 27, 1980

[30] Foreign Application Priority Data

Oct. 25, 1979 [NL] Netherlands .................. 7907833

[51] Int. Cl.³ .............................................. F22B 7/00
[52] U.S. Cl. ..................................... 122/158; 122/14; 122/155 A; 122/161
[58] Field of Search ........... 122/135 R, 155 R, 155 A, 122/160, 161, 121, 122, 182 R, 14, 16, 17, 158

[56] References Cited

U.S. PATENT DOCUMENTS

| | | | |
|---|---|---|---|
| 1,784,338 | 12/1930 | Clarkson | 122/182 R |
| 2,173,115 | 9/1939 | Hutto | 122/182 R |
| 2,834,323 | 5/1958 | Radford | 122/114 |
| 4,096,851 | 6/1978 | Maruyama | 122/160 X |
| 4,271,789 | 6/1981 | Black | 122/16 |
| 4,282,833 | 8/1981 | Giesen | 122/161 X |

Primary Examiner—Edward G. Favors
Attorney, Agent, or Firm—Jon Lewis

[57] ABSTRACT

A hot water boiler, e.g. for central heating, has two castings which contain water passages and are connected together to enclose a combustion chamber and above it a flue. From the flue, the burned gases pass downwardly through passages outside the castings into which ribs on the castings project. In order to improve thermal efficiency by achieving considerable condensation of water vapor on the burned gases, the castings are located on a sump into which the downward passages for burned gas open and which has means for removing condensate collecting in it. A blower is provided to extract the burned gas from the sump.

8 Claims, 6 Drawing Figures

HOT WATER BOILER

BACKGROUND OF THE INVENTION

1. Field of the Invention

The invention relates to a hot water boiler especially though not exclusively a central heating boiler.

2. Description of the Prior Art

Having regard to the rise in the cost of energy, there has in recent years been a strongly felt need for designs of hot water appliances which provide a higher thermal yield in the water. A customary method for expressing the thermal yield of gas-fired boilers is based on the higher calorific value of the fuel i.e. on the calorific value of the fuel including latent heat. With conventional designs for hot water boilers, it is no simple matter to achieve a thermal yield in the water defined in this way exceeding 80%.

Attempts have been made to improve the thermal yield by improved heat exchange between the fumes or burned gases and the water. U.S. Pat. No. 4,282,833 to Giesen describes a boiler having two juxtaposed and mutually connected hollow castings provided with passages for the water and enclosing a combustion chamber and, above it, a burned gas flue. The flue is connected to two passages which extend downwards on either side of the castings, with ribs being cast at either side of the castings projecting into the downward passages and, preferably, also into the water passages.

SUMMARY OF THE INVENTION

The object of this invention is therefore to provide a design giving a higher thermal yield. The aim is a yield of over 90% or even 94%. At the same time a simple construction is sought, particularly one comprising fewer heat-exchanging surfaces.

The invention as claimed seeks to provide a solution. Briefly, the castings enclosing the combustion chamber are located above a sump into which the burned gas passages extending down outside the castings open. A blower for the burned gases extracts them from the sump. Provision is made for the removal of condensate from the burned gases from the sump. Although the blower can be fastened to one side of the sump, preferably it is located at the upper side of the sump, next to the castings.

In this new design, the burned gases pass upwards once only and then downwards along the castings, so that simplicity in design is achieved. The boiler is also specially designed for a heat transfer to the castings with condensation of water in the burned gases, so that the gases can be cooled down practically to the initial temperature of the water. In particular, the mass, the material and the shape of the outside of the castings, with the ribs on them, are such that in normal operating circumstances and during both continuous and intermittent operation at least half the water vapour present in the flue gases is condensed on the outer wall of the castings and on the ribs located on them.

The choice of, for example, aluminum as the material for the castings is particularly important in this case since the casting wall temperature then remains lower longer during repeated heatings in intermittent operation and condensation is therefore more prolonged.

It should be noted that it is known, from the theory of heat transfer by combustion gases, that the transfer yield rises rapidly if the wall to be warmed is kept sufficiently cool for intensive condensation to take place against it. For this, the wall must usually be kept at a temperature of less than 55° C., and preferably at about 45° C.

Central heating boilers are usually adjusted with the aid of a thermostat on the on/off principle. The boiler burns, e.g. for three minutes, and subsequently cuts out for e.g. seven minutes. An expert in the heat transfer field can in each case calculate how great the mass and what the shape of the castings should be for the above requirements for condensation operation to be met. The condensate formed is collected in the sump and can run off via a discharge pipe, e.g. via a syphon. The flue gases which thereafter still contain only a fraction of the original humidity are then drawn off upwards by the blower.

So that condensation can occur as effectively as possible over the outer surface of the castings, it is important for the water passages in the castings and the ribs on them to be particularly adapted for this requirement. This may be achieved in the boiler of the invention if the water passages in the castings extend substantially straight and vertically in contrast to many known designs with an upward widening at the point where the combustion chamber becomes the burned gas flue above the chamber and if the ribs on the outside of the castings project further at the upper end of the castings than at the lower end. As a result of the latter feature, the downwardly extending passages narrow downwardly at the outer side of the castings, so that the condensable water vapour enters into closer contact with the wall.

It is also important for as little heat as possible to flow away to the parts of the structure which do not pass this heat onto the water, and that none of the water in the burned gases should condense in the combustion chamber or in the flue above it. The burned gases should desirably fall to a temperature at which such condensation commences only when they turn to pass downwards. This may be achieved in a boiler of the invention if the castings at least at the top ends of the combustion chamber are provided with an insulated external cladding and the downwardly extending passages outside the castings are bonded on the outside by a thin-walled material, preferably one having poor thermal conductivity, which has insulating covering. An additional beneficial effect is obtained by a radiation screen round a burner in the combustion chamber, which screen is spaced from the castings and extends for one third to half the height of the castings within the combustion chamber. This radiation screen prevents too much heat being transferred from the flames to the uncooled top surfaces and adjoining parts of the sides of the castings and also maintains the burned gases at a high temperature to well within the flue above the burner chamber. The effect of the radiation screen can be further improved by cooling it on the outside. This is possible by connecting the space between the castings and the radiation screen to the combustion air supply, so that the cold combustion air can circulate along the outside of the radiation screen. This has the additional advantage that the cold air stream can prevent the deposit of dirt from the burned gases against the wall of the castings directed towards the combustion chamber.

Although the greater part of the water in the burned gases is preferably already condensed before the gases reach the sump, and although the condensate will mainly be collected in the sump or condensation tray, some after-condensation may still occur in the outlet from the sump as a result of the very low residual temperature of the flue gases. It is therefore recommended that the blower is connected to a draft interrupter in which a chimney pipe can be fitted, the draft interrupter including an annular condensation trough projecting inwardly into the flow of gases and having a drainage opening. The drainage opening may in turn connect up e.g. to a sump or can also be linked directly to a discharge via a syphon.

Depending on the residual temperature of the flue gases in the discharge outlet, consideration can further be given, if necessary, to conducting the incoming combustion gas round the stack through a double jacket before conveying it to the combustion area.

Effective operation of the boiler with a high yield may also be dependent on the water being able to flow unhindered through the castings in an upward direction, on it being uniformly distributed over the breadth of the castings, and no air pockets forming within the castings. To this end, preferably the turns from the upward flue to the downward passages for the burned gases are through openings in the castings and the water passages in the castings narrow at their top ends towards the centre of the castings where they are connected to the water discharge openings.

As has already been noted, it is important that the lower end of the castings be kept at a sufficiently low temperature for condensation to occur. This can be assisted if water supply openings at the lower ends of the castings are jet-type passages and are arranged so that the water is directed against the walls opposite to the walls of the combustion chamber.

Although the condensation of the water from the flue gases is largely determined by the mass and shape of the external surfaces of the castings, it is still important for the film of condensate to be as thin as possible. If this film is too thick, it reduces the heat transfer to the castings and prevents further condensation. In order to keep the water film as thin as possible, steps should preferably be taken to convey the condensate away along the castings effectively and rapidly. This also prevents the condensate formed from re-evaporating and taking heat away from the water within the castings when the gas burner is switched off. Rapid discharge can be achieved by shaping the ribs at the outside of the castings as vertical fins which are interrupted in a staggered manner, the lower surfaces of the fins sloping inwardly and downwardly towards the walls of the castings, the fins being laterally separated from each other by small runnels.

A particular advantage of the new design, finally, is that it may consist of easily mountable parts. In order to achieve an effective seal between these parts it is conceivable for the contacting surfaces to be finished for tight fitting, but a cheaper design can be obtained by pulling the castings, the sump and the various covers close together by means of clamping means e.g. bolt connections, a seal being achieved by means of tubes of a flexible, temperature-resistant material, such as silicone rubber, laid in shallow grooves.

BRIEF INTRODUCTION OF THE DRAWINGS

An embodiment of the invention will be described below by way of non-limitative example with reference to the accompanying drawings, in which.

DESCRIPTION OF THE PREFERRED EMBODIMENT

Figure 1:
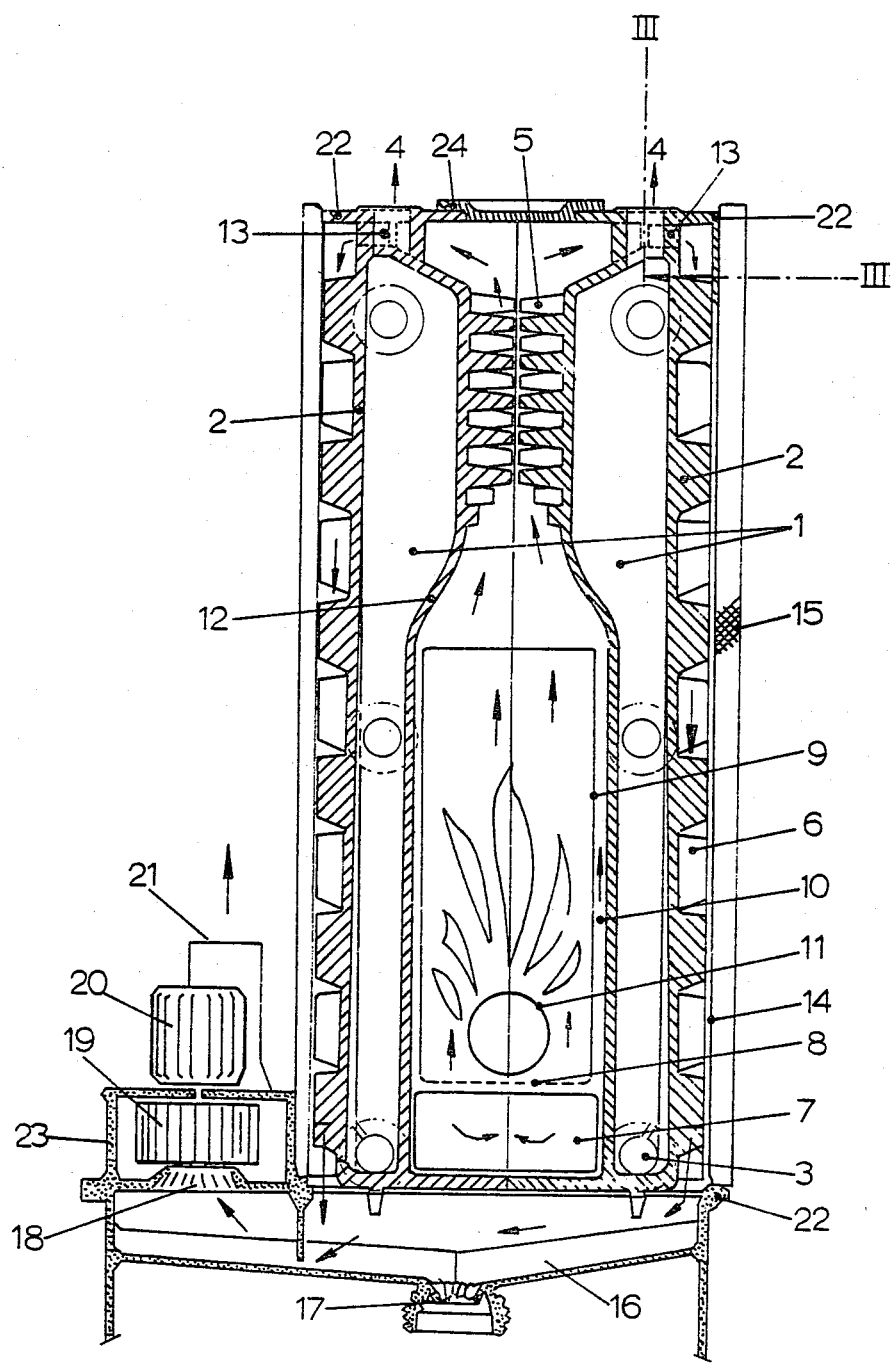
FIG. 1 shows the preferred embodiment of the boiler of the invention in longitudinal vertical section.

FIG. 1 shows two hollow castings 1 containing passages for water and assembled together to provide the body of the boiler. The castings 1 are provided with surfaces in front and behind (as seen in FIG. 1) which fit together at their edges and by welding the surfaces along these edges a single structure is obtained. Top and bottom surfaces of the castings, as indicated in the drawing, are similarly connected to each other by welds. The castings are made of a light metal aluminium alloy. Ribs 6 are integrally cast on the external walls 2 of the castings. Although not shown in the drawings, ribs running horizontally can be cast within the water passages in castings, in order to obtain a labyrinthine path through the water passages.

Openings 3 are provided in the rear walls of the castings 1 at the lower ends connecting to tubes lying at the bottom of the water passages, from which jets of incoming are directed against the outer walls 2 of the castings, i.e. the walls opposite the walls of the combustion chamber. There are openings 4 at the top of the castings 1 to which discharge pipes for the heated water are in use connected. Pins 5 are cast on the inside of the castings so as to project into a burned gas flue which extends upwardly from the combustion chamber. An opening 7 is let into the front surface of the boiler through which combustion gas can be sucked diagonally inwards, the gas being then conducted through an air distributor plate 8 to flow uniformly along a gas burner 11. The burned gases resulting flow upwards through the burned gas flue. The transition from the combustion chamber to the flue is marked by a narrowing 12 in the gas passage and a corresponding upward widening in the water passages. Above this the gases impart some of their heat to the fingers 5 before passing from the inside of the castings to the outside through the gas ports 13.

Figure 3:
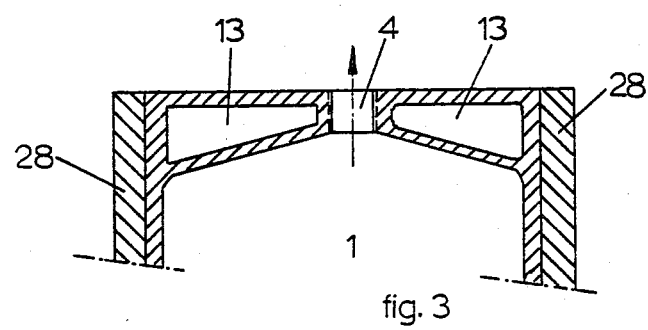
FIG. 3 shows a detail in section along the line III—III in FIG. 1.

FIG. 3 shows how the gas ports 13 and the water discharge 4 cross by each other. It also shows that the front and rear surfaces of the castings are provided on their outer side with a layer of insulating material 28 in order to prevent heat loss through these surfaces. The burned gases then flow downwards between the ribs 6, closed passages being obtained by means of a thin steel plate 14 which lies against the ribs 6. This steel plate 14 is fastened tight against the castings. It is in turn provided on its outer side with a layer of insulating material 15, so that virtually no heat loss and heat transfer is possible between the flue gases and the steel plate 14. The passages formed by the ribs 6 narrows downwardly since the height (projection) of the ribs is gradually reduced. Since the water vapour in the burned gases condenses in these downward passages it is important for contact between the ribs and the flue gases to be as good as possible. This is achieved inter alia by the narrowing of these downward passages.

The castings 1 are fitted closely to a cast sump 16 which has a floor sloping down to a low point at which a condensate discharge opening 17 allows condensate collecting in the sump to be removed, for example to a drain. The downward passages for the burned gases open directly into the sump, which can thus act to collect the condensate from the gases.

A lid-shaped element 23 is placed on the sump 16 next to the castings and carries the impeller 19 of a blower. This impeller is driven by a motor 20. The lid 23 acts as the impeller housing and is connected to a discharge 21 for the burned gas, which at this stage is largely free of water vapour.

A radiation screen 9 is fitted round the burner 11 in the combustion chamber, while leaving open a slot-shaped space between it and the inner walls of the castings. Part of the incoming combustion gas can flow upwards between the radiation screen 9 and the castings, so that the radiation screen is cooled. This prevents heat transfer between the flames and the front and rear surface of the boiler, while too rapid cooling of the burned gases is also prevented. These gases, on passing through the flue ports 13, should still have a temperature which is sufficiently high that condensation does not occur before the ports 13 are passed. The narrowing 12 in the inner walls of the castings and the slot shaped space 10 also hinder soot and dirt from collecting against the inner walls of the castings. An inspection cover 24 is fitted to the top of the boiler.

The walls of the castings, the material from which they are made and the shape of the ribs 6 are such that intensive condensation of the water vapour occurs along the outer wall of the castings and against the ribs 6. In this way, this boiler differs essentially from other boilers where the aim has always been a sufficiently high flue gas temperature to prevent condensation in the burned gas outlet, e.g. a chimney stack. In the present boiler, on the other hand, the burned gases may be rendered sufficiently dry through intensive condensation of the water vapor within the boiler. This also produces an appreciable improvement in the heat transfer, so that the boiler has a remarkably high thermal yield.

Figure 2:
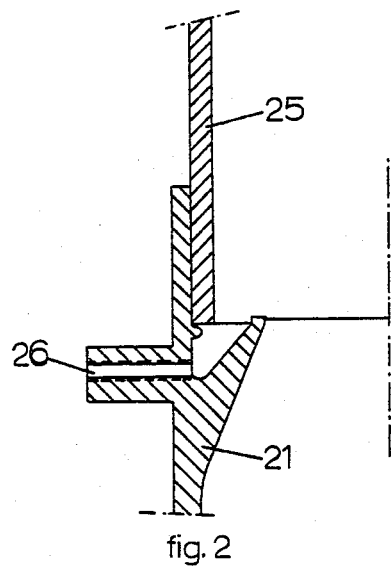
FIG. 2 shows a detail of the burned gas discharge in the boiler of FIG. 1.

A draft interrupter can be provided in the burned gas discharge 21 in the customary manner. FIG. 2 indicates how such a draft interrupter can be designed so that any water vapour still present in the flue gases and condensing against the stack 25 can be caught and drained off along a condensate pipe 26 without the condensate damaging the flue gas blower.

Figures 4A, 4B, 4C:
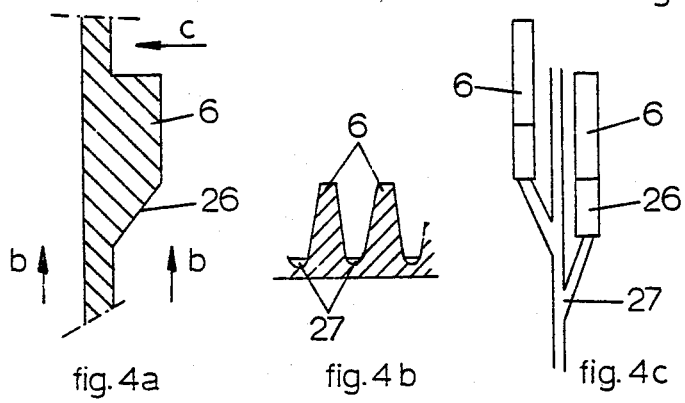
FIG. 4A shows a fin of the boiler of FIG. 1 on enlarged scale.
FIG. 4B is a view on the line B—B in FIG. 4A.
FIG. 4C is a view in the direction C in FIG. 4A.

FIGS. 4A, B and C are views and/or sections of ribs 6. They show that the ribs 6 are grouped as vertically extending fins which are interrupted in a staggered manner (i.e. the interruptions of each fin are vertically offset from the interruptions of the two adjacent fins). The lower surfaces 26 of these ribs 6 slope downwardly and inwardly to the walls of the castings, and ducts or runnels 27, separate the fins. This allows condensate forming to collect and flow away easily and rapidly. The film of condensate on the ribs thereby remains thin, which also leads to an improved heat transfer and restricts the re-evaporation of the water in the film.

What is claimed is:
1. A hot water boiler having
  (a) an assembly comprising at least two juxtaposed hollow castings which contain water passages for the water being heated and are joined together to form said assembly, which encloses a combustion chamber and a flue for burned gases extending upwardly from said combustion chamber,
  (b) passages extending downwardly outside said castings on opposite sides of said assembly and connected at their upper ends to the said burned gas flue, whereby the burned gases flow downwardly through the said downwardly extending passages,
  (c) a plurality of ribs cast integrally with the castings on the outsides thereof so as to project into the said downwardly extending passages,
  (d) a sump which is located below the castings and into which the said downwardly extending passages open so that the burned gases flow into the sump,
  (e) a discharge conduit for the burned gases,
  (f) a blower connected to the sump and to the discharge conduit for forced discharge of the burned gases from the sump to the discharge conduit,
  (g) means for the extraction from the sump of condensate from the burned gases which in use collects therein, wherein said water passages in the castings run mainly upwardly substantially straight and vertically with a widening upwardly where the combustion chamber meets the burned gas flue and wherein said ribs on the outside of the assembly of castings project farther at the upper end of the castings than at the lower end.

2. A hot water boiler of the type having at least two juxtaposed hollow castings containing passages for water and joined together to form an assembly enclosing a combustion chamber and a burned gas flue above the chamber, the boiler including passages for the burned gases which passages are connected to said flue and also extend downwardly outside said castings on opposite sides of said assembly, said castings including ribs which project into said downwardly extending passages, the boiler including: a sump disposed below said castings into which sump said downwardly extending passages open; a burned gas blower connected to said sump to force the gases from the sump into a gas discharge outlet; means in the sump for removal of any condensate collecting in the sump, wherein further the water passages in the castings run mainly upwardly substantially straight and vertically with a widening upwardly where the combustion chamber meets the burned gas flue, and wherein the ribs on the outside of the assembly of castings are projecting farther at the upper end of the castings than at the lower end.

3. A boiler according to claim 2 wherein the castings at least at the upper end of the combustion chamber are provided with an insulated external cladding and the said downwardly directed passages are closed at their outside by thin-walled material having an insulated cover.

4. A boiler according to claim 2 wherein said burned gas blower is provided with a draft interrupter which is located downstream of the blower and within which a chimney pipe is fitted, the draft interrupter including a condensation trough, with discharge, for collection of condensate from the chimney pipe.

5. A boiler according to claim 2 including openings in the castings interconnecting said burned gas flue to the downwardly extending passages and wherein the water passages in the castings at their upper ends narrow towards the middle of the castings and connect to water outlet openings.

6. A boiler according to claim 2 including water supply openings to said water passages at the bottom of the castings said water supply openings being arranged to direct incoming water as a jet against the walls of the passages opposite to the wall of the combustion chamber.

7. A boiler according to claim 2 wherein the ribs on the outside of the castings are shaped as vertically extending fins which are interrupted in a staggered manner and the bottom surfaces of which slope downwardly and inwardly towards the outside walls of the castings, circumferentially adjacent pairs of fins being separated by narrow runnels.

8. A boiler according to claim 2, including exterior cladding, wherein the castings, the sump and said exterior cladding are drawn together by clamping means, a seal being obtained between them by means of tubes of a flexible, temperature-resistant material laid in shallow grooves.

* * * * *